T. H. & L. L. DILGER.
STRAINER.
APPLICATION FILED JUNE 22, 1910.

988,291.

Patented Mar. 28, 1911.

WITNESSES:
George Bambay.

INVENTORS
Theodore H. Dilger
Loren L. Dilger
BY
Munn & Co.
ATTORNEYS

UNITED STATES PATENT OFFICE.

THEODORE H. DILGER AND LOREN L. DILGER, OF LAMAR, INDIANA.

STRAINER.

988,291.  Specification of Letters Patent.  Patented Mar. 28, 1911.

Application filed June 22, 1910. Serial No. 568,275.

*To all whom it may concern:*

Be it known that we, THEODORE H. DILGER and LOREN L. DILGER, citizens of the United States, and residents of Lamar, in the county of Spencer and State of Indiana, have invented a new and Improved Strainer, of which the following is a full, clear, and exact description.

The invention is an improvement in strainers, and is designed primarily for straining milk directly as the milk is milked from the cow, and in this manner preventing foreign matter, such as dandruff, hair, dust, etc., from entering the milk can, the strainer being provided with a waste pipe, through which the foreign matter and milk foam is discharged during the milking operation. By thus cleansing the milk no opportunity is afforded for foreign particles dissolving or softening, when they would not be removed by a strainer, as is the case when the milk is strained at a later period.

Reference is to be had to the accompanying drawings forming a part of this specification, in which similar characters of reference indicate corresponding parts in both views.

Figure 1:
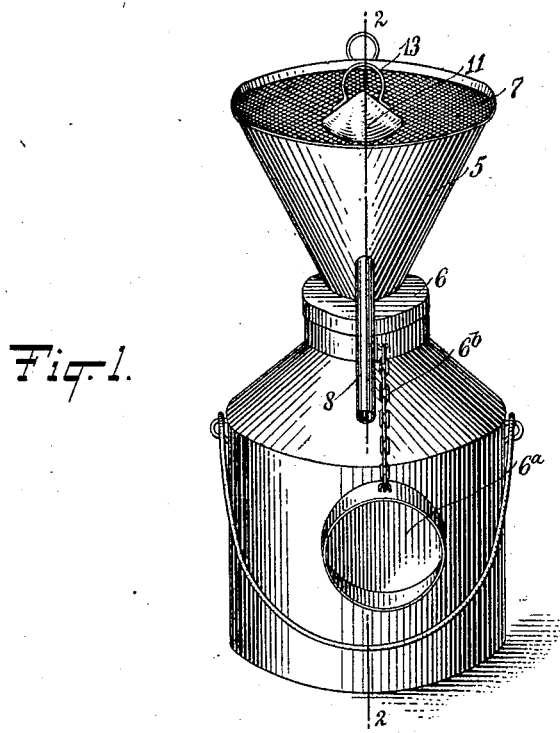
Figure 2:
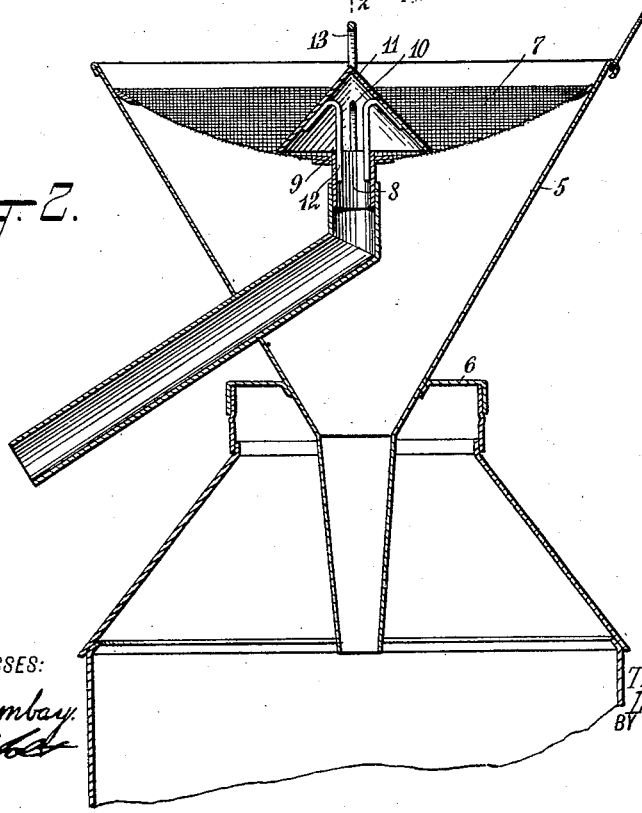

Figure 1 is a perspective view illustrating our improved strainer as applied to a milk can, and in readiness for use; and Fig. 2 is a central vertical section of the same substantially on the line 2—2 of Fig. 1.

In the construction of the strainer we employ an ordinary funnel 5, which we provide externally near the neck with an attached milk can cover 6, the cover having an opening receiving the funnel, and is soldered or otherwise secured thereto and forming a tight joint therewith so that it is impossible for dirt or other foreign matter to pass into the can at this point, the cover when applied to the can supporting the funnel in an upright position. In the upper portion of the funnel, depressed slightly above the upper edge, is a strainer screen 7, which is shown to be dished, with the lowest point at the center. From this point of the strainer screen a waste pipe 8 leads to the outside of the funnel, the upper end of the pipe extending slightly above the screen, as indicated at 9, and the lower portion of the pipe downwardly and outwardly inclined so as to discharge by gravity.

The waste pipe is shown in Fig. 2 to be made of two sections, the upper section being in the form of a nipple, removably fitting within the lower section, and the lower section fixed, by soldering or other suitable way, to the side of the funnel. Over the upper section or nipple of the waste pipe is provided a bail or finger-piece 10, by which the nipple, together with the strainer screen, can be lifted from the funnel 5.

A conical hood or cap 11 is provided with a number of spring fingers 12, ordinarily 3, which extend from its under side and are adapted to frictionally engage within the nipple of the waste pipe, the hood being substantially larger in diameter at the bottom than the waste pipe, and provided with a bail or finger-piece 13 at the top for removing and applying it. With the hood arranged in position, as shown in the drawing figures, with the lower edge slightly above the adjacent portion of the strainer screen, the milk can not fall into the waste pipe; such as falls upon the hood will be shed onto the screen a substantial distance from the waste pipe, where it will be strained into the funnel, with the milk falling or running upon the outer portion of the screen. The foreign matter falling on the screen will be prevented thereby from passing into the can, and, together with a substantial quantity of the milk foam, will pass under the lower edge of the hood and flow out through the waste pipe. The relatively small quantity of milk which passes with this foreign matter and serves to wash it through the waste pipe is suitable for use in feeding dogs and cats.

By reason of the particular assemblage of the strainer screen, waste pipe and the hood, the hood and screen are readily separated and removed from the funnel, together with the upper section or nipple of the waste pipe, which permits of the strainer being easily washed and kept in a clean and sanitary state.

We have shown in Fig. 1, the usual cover 6ª, for the milk can, connected thereto by a chain 6ᵇ, so as to prevent the cover from being placed on the ground or other place where it is liable to pick up dirt or be lost from the can, the cover replacing the strainer cover 6 when the strainer is removed.

Having thus described our invention, we claim as new and desire to secure by Letters Patent:

1. The combination of a funnel, a strainer screen arranged within the funnel, a waste pipe leading from a depressed point of the screen to the outside of the funnel, and a hood arranged above the screen over the open upper end of the waste pipe.

2. The combination of a funnel, a screen removably seating within the funnel, a waste pipe leading from the screen, and a hood removably supported over the waste pipe.

3. The combination of a funnel, a screen removably seating within the funnel, a waste pipe leading from the screen, and a hood having spring fingers supporting it over and removably fitting within the waste pipe.

In testimony whereof we have signed our names to this specification in the presence of two subscribing witnesses.

THEO. H. DILGER.
LOREN L. DILGER.

Witnesses:
 LUCY PENNINGTON,
 MINNIE PENNINGTON.

---

Copies of this patent may be obtained for five cents each, by addressing the "Commissioner of Patents, Washington, D. C."